United States Patent [19]

Martin

[11] 4,254,440
[45] Mar. 3, 1981

[54] MAGNETIC TAPE HEAD ALIGNMENT

[75] Inventor: David W. Martin, Morris Plains, N.J.

[73] Assignee: Bell Telephone Laboratories, Incorporated, Murray Hill, N.J.

[21] Appl. No.: 64,173

[22] Filed: Aug. 6, 1979

[51] Int. Cl.³ .................... G11B 5/43; G11B 21/10
[52] U.S. Cl. .................................... 360/76; 360/109
[58] Field of Search .................. 360/76, 75, 109, 27, 360/22, 31, 134; 371/1

[56] References Cited

U.S. PATENT DOCUMENTS

| | | | |
|---|---|---|---|
| 2,937,239 | 5/1960 | Garber, Jr. et al. | 360/76 |
| 3,049,583 | 8/1962 | Bremer | 360/109 |
| 3,852,815 | 12/1974 | Ljudmirsky et al. | 360/75 |
| 4,053,937 | 10/1977 | Hersey, Jr. | 360/77 |
| 4,062,047 | 12/1977 | Scull | 360/76 |

FOREIGN PATENT DOCUMENTS

| | | | |
|---|---|---|---|
| 1398690 | 6/1975 | United Kingdom | 360/76 |
| 1491176 | 11/1977 | United Kingdom | 360/76 |

OTHER PUBLICATIONS

IBM Tech. Disc. Bull., B. N. Harding, Skew–Indicator Circuit, vol. 19, No. 5, Oct. 1976, p. 1886.

*Primary Examiner*—Alfred A. Eddleman
*Attorney, Agent, or Firm*—Joseph P. Kearns

[57] ABSTRACT

An arrangement for aligning single-track magnetic record/reproduce heads in magnetic tape transports in both azimuth (skew alignment) and track position (vertical alignment) employs a single test tape. Dual test tracks within the width of a single head contain prerecorded blocks of pulses of alternating polarity, respectively uniformly and nonuniformly spaced. The nonuniformly spaced pulses are increasingly separated from each other in each block from a value below to a value above, and passing through, the uniform spacing of the other track. Reading the two tracks simultaneously from the head being aligned mixes the separate pulse trains to form a wave pattern with a symmetrically centered null in each block when the head is properly aligned and a nonsymmetrically located null of varying depth when the head is improperly aligned. It is unnecessary to move the head while the type and degree of misalignment is being determined. Alignment adjustment can be performed while the test tape is being read.

7 Claims, 10 Drawing Figures

MAGNETIC TAPE HEAD ALIGNMENT

FIELD OF THE INVENTION

This invention relates to apparatus and method for aligning a magnetic head with a moving magnetic recording medium.

BACKGROUND OF THE INVENTION

In magnetic tape recording applications, such as computer data storage, data are recorded on or read from one or more parallel tracks positioned on a magnetic tape. For reading and writing, the tape is moved at constant speed past one or more magnetic tape heads. In order to ensure unambiguous readings and recordings, it is necessary to establish and maintain a fixed orientation of the tape head with respect to the moving tape. A standard orientation maintains the tape head centered transversely on the track passing it and the record gap therein at a ninety-degree angle relative to the direction of tape travel. Centering the head crosswise of the track is known as vertical or transverse alignment. Angular positioning is known as skew or azimuth alignment Conventionally skew and vertical alignment are checked by means of separate test tapes having alternating current signals recorded on at least two tracks. Signals read from two tracks on a skew alignment test tape are compared for synchronism by simultaneous observation on an oscilloscope, as described, for example, in H. R. Scull U.S. Pat. No. 4,062,047, granted Dec. 6, 1977. The phase difference between two test signals is a measure of the skew misalignment. A different test tape having alternating current signals extending across different widths is often used as described in L judmirsky et al. U.S. Pat. No. 3,852,815, granted Dec. 3, 1974, for the determination of vertical alignment.

With single track data recorders, i.e., one track for each direction of tape travel, conventional methods of testing and alignment require up and down movement of the head with one test tape for vertical position followed by an angular, rocking movement of the head with another test tape for skew position.

It is an object of this invention to provide a single test tape for inspection and alignment of magnetic tape heads in data recorders with respect to both vertical and skew positions simultaneously and to eliminate the vagaries associated with prior methods which require movement of the head. The required inspection is rapid enough, moreover, for use in a production environment.

SUMMARY OF THE INVENTION

According to my invention, two channels of test pulses within the normal width of a record/reproduce magnetic head are recorded in blocks of uniform length as digital pulses or transitions of alternating polarity. In the first channel of each block pulses of constant amplitude, alternating polarity and uniform spacing are recorded. In the second channel of each block pulses of constant amplitude, alternating polarity and linearly increasing spacing from a value less than the uniform spacing in the first channel to a value exceeding it are recorded with the further specification that pulses in the second channel at the center of each block are spaced by the uniform amount but synchronized and oppositely poled with respect to the pulses in the first channel. During the first half of each block of test pulses, the transitions of the second channel lead the oppositely poled transitions of the first channel by a smoothly decreasing amount. At the center of each block, the transitions of the second channel approach and pass through synchronism with those in the first channel. During the second half of each block, the transitions of the second channel lag those of the first channel by a smoothly increasing amount.

When these two channels are read on a single track head spanning them, the envelope of the resultant mixed and integrated signal can be displayed on an oscilloscope. When the read head is perfectly aligned both vertically and in skew, the envelope exhibits a null centered in each displayed block length. A skew misalignment causes the null to appear on either side of the correct center position. A vertical misalignment causes the depth of the null to be reduced.

The oscilloscope display can also be observed while head adjustments are being made, as on a factory production line.

BRIEF DESCRIPTION OF THE DRAWING

This invention will be understood from the following detailed description when read with reference to the drawing in which.

DETAILED DESCRIPTION

Figure 1:
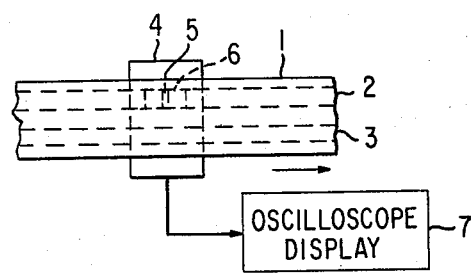
FIGS. 1 through 4 show representative positions that a magnetic head with its interpolar gap can assume with respect to a moving magnetic medium in tape transport apparatus.

The relative positions of a magnetic head with respect to a moving magnetic medium are shown in FIGS. 1 through 4 for several possible orientations. FIG. 1 shows a magnetic tape moving in a direction from left to right past a magnetic head 4. Tape 1 is assumed to have two recording tracks 2 and 3 thereon. For the left-to-right motion shown, only upper track 2 is in use. Track 3 comes into use when the cartridge containing the tape is turned over and run in the opposite direction so that track 3 is then under the core 6 of tape head 4. Core 6 includes an interpolar gap 5 therein whose height is equal to the track width. The signal output of the head under test is exhibited on a conventional oscilloscope display 7. FIG. 1 shows in particular the magnetic tape head 4 in correct vertical and skew alignment with track 2 on tape 1, i.e., gap 5 is perpendicular to the direction of travel of tape 1 and track 2 crosses the center of gap 5 relative to its vertical dimension. An arrow indicates an assumed direction of travel for the magnetic medium.

Figure 2:
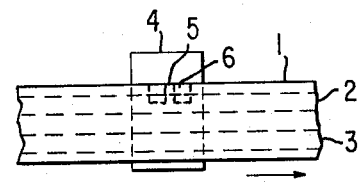

FIG. 2 contains the same elements with the same designators as FIG. 1. However, head 4 is misaligned vertically with tape 1, although the skew alignment is correct. In this condition a weak and possible distorted response would be obtained by head 4 from track 2.

Figure 3:
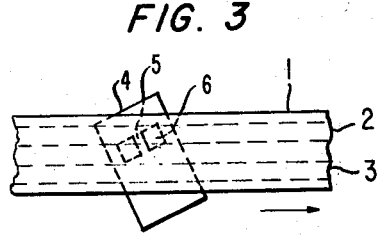

FIG. 3 also contains the same elements as FIGS. 1 and 2. Here head 4 is misaligned vertically with track 2 and is clearly too low, since the top edge of gap 5 is at track center. Head 4 is also misaligned in azimuth in that it is canted toward the left (although much exaggerated for graphic purposes). A weak and much distorted response results.

FIG. 4 again contains the same elements as FIGS. 1 through 3. Here an exaggerated skew misalignment is shown in that gap 5 in core 4 is not perpendicular to track 2 on tape 1, although there is no vertical misalignment. In this condition pulses recorded on track 2 are severely distorted by stretching and their transitions would be rendered ambiguous and unreadable.

In the typical head mounting provision is conventionally made for adjustment to and away from the tape, up and down with respect to the tape track, and rotationally with respect to skew by means of individual screws.

Figure 5:
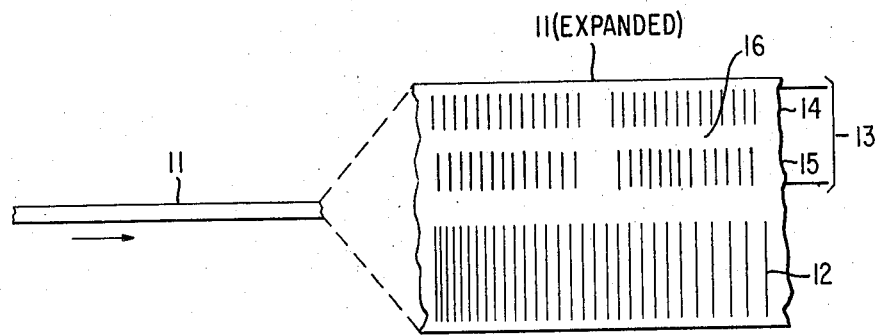
FIG. 5 is a diagram of a representative test tape showing the relative position of two-channel test signals recorded thereon in accordance with this invention.

FIG. 5 is diagrammatic of a common magnetic tape employed in cartridges. Tape 11 on the left is shown in normal scale. On the right the same tape is expanded to show the positions of two tracks 12 and 13 normally provided for alternate directions of travel.

Normally tape 11 contains space assigned to two parallel message tracks 12 and 13 of the width indicated, and matching the height of the head gap in the magnetic pickup. Magnetic tape heads are designed to span either of these track widths. For the purpose of this invention track 13 is divided into two channels 14 and 15 of somewhat less than half the width of message track 13 with blank guard space 16 therebetween. Pulse patterns are recorded on these channels in a conventional manner according to this invention from tape heads of narrower than normal width. Once the patterns have been recorded, however, standard full-track-width heads are used in the alignment procedure with the result that the signals on both channels are read simultaneously and integrated.

A pulse pattern according to this invention illustratively comprises parallel pulse trains organized into periodic blocks of constant amplitude. Each block in one of the parallel trains contains as a reference signal evenly spaced transitions of alternating polarity, e.g., a square wave of a constant frequency on the order of the normal data transmission rate. On the other train as an auxiliary signal each block, synchronized with the blocks in the first train, contains transitions of alternating polarity spaced by linearly expanding intervals such that the interval at the center of the block is the same as the even spacing between transitions in the first pulse train and with the further condition that the center transitions are opposite in polarity to corresponding transitions in the first train. The form of the second pulse train can be that of a nonperiodic square wave. In practice the spacings in each block must be maintained such that pulses in the variably spaced blocks neither lead nor lag those in the reference blocks by more than half the reference spacing, i.e., the spacing of the variable pulses ranges between one-half the reference spacing ahead and one-half the reference spacing behind the reference pulses. A representative reference spacing is on the order of one and one and one-half milliseconds.

FIGS. 6 through 9 are waveforms resulting from simultaneous reading of the pulse trains described above by single heads spanning them when the heads are positioned with respect to the moving magnetic media as shown in FIGS. 1 through 4, respectively.

Figure 6:
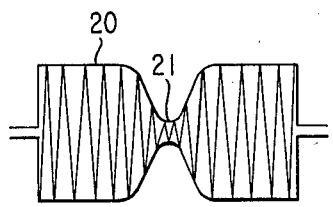
FIGS. 6 through 9 show representative signal envelopes observed on an oscilloscope when the test tape of FIG. 5 is read by magnetic heads positioned as shown in FIGS. 1 through 4, respectively.

FIG. 6 shows an envelope 20 with a sharp null 21 centered therein. The width of the envelope corresponds to the block width of the pulse trains on the test tape. This envelope represents the response of a properly aligned head in both vertical and skew aspects. The null at the center results from the coincidence of spacings between the oppositely poled transitions in the two pulse trains on the test tape.

Figure 7:
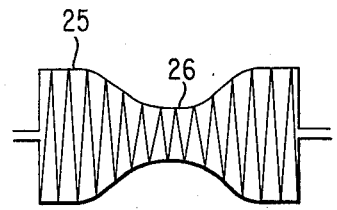

FIG. 7 shows an envelope 25 with a shallow, symmetrical null 26 at the center indicative of vertical misalignment without skew misalignment, corresponding to the physical relationship shown in FIG. 2. The depth of the broader null is a function of the amount of vertical offset of the head. No indication of the direction of the displacement is thereby obtained, but this would become apparent from a visual inspection of the head itself.

Figure 8:
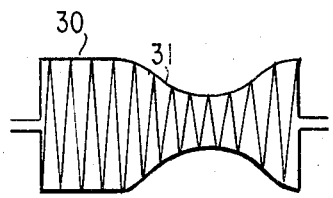

FIG. 8 shows an envelope 30 with a shallow null 31 as in FIG. 7, but located off-center to the right. This envelope indicates that both vertical and skew misalignment are present together.

Figure 4:
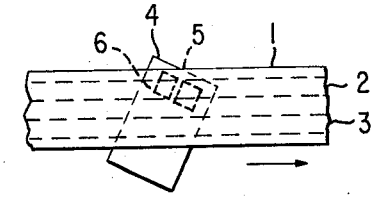
Figure 9:
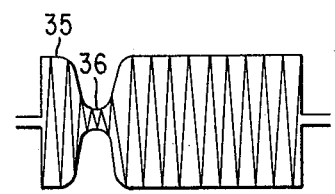

FIG. 9 shows an envelope 35 with an off-center null 36, corresponding to the condition of a head tilted toward the right as shown in FIG. 4. If head 4 were tilted to the left, null 36 would appear to right of center.

It is apparent from the waveform envelopes of FIGS. 6 through 9 that a wide range of information about both skew and vertical alignment problems with magnetic heads is made available from the single test tape of this invention.

Figure 10:
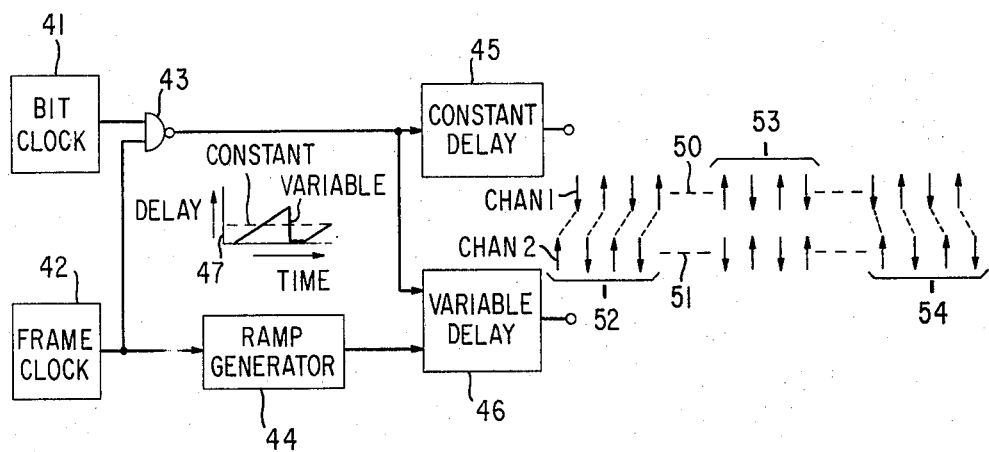
FIG. 10 is a block diagram of a circuit for generating blocks of test pulses on a test tape in accordance with this invention.

FIG. 10 is a block diagram of a circuit for generating the two channels of test pulses required for the pulse trains recorded on the test tape of this invention. The required circuit comprises bit clock 41, frame clock 42, NAND-gate 43, ramp generator 44, constant delay unit 45 and variable delay unit 46. Bit clock 41 provides a train of timing pulses of alternating polarity or a square wave with transitions of alternating polarity at a rate approximating the intended data rate. Frame clock 42 provides a block length pulse spanning a plurality of bit-rate pulses from clock 41. Frame clock 42 drives ramp generator 44 directly. Ramp generator 44 provides a linearly increasing output within each block length to variable delay unit 46. The output of ramp generator 44 is diagrammed in sketch 47. Frame clock 42 also controls NAND-gate 43 as a transmission gate whereby a fixed number of bit pulses drive constant delay unit 45 during each test block. Variable delay unit 46 provides continually increasing delay to the pulse train applied to it from the output of gate 43.

A pulse diagram adjacent to the block diagram as part of FIG. 10 shows the constant-spacing pulse train 50 in the output of constant delay 45 and the variable-spacing pulse train 51 in the output of variable delay 46. These two pulse trains of alternating polarity are recorded by conventiononl means on closely spaced parallel tracks on a test tape. The constant-spacing pulse train of channel 1 is shown as spikes of equal amplitude and uniform spacing. The variable-spacing pulse train of channel 2 is shown as spikes of equal amplitude but linearly increasing spacing from a value that gives the effect of pulses in channel 2 leading those in channel 1 during an initial segment 52, having the same spacing as, and coincident with, those in channel 1 during a central segment 53 and finally lagging those in channel 2 during a final segment 54. The outputs of delay units 45 and 46 are recorded on the test tape by conventional means.

While this invention has been disclosed by means of a specific illustrative embodiment, the principles thereof are capable of a wide range of modification by those skilled in the art within the scope of the following claims.

I claim:

1. A system for establishing alignment of a transducing head with respect to a moving magnetic recording medium having recorded thereon for test purposes parallel information tracks by means of an oscilloscopic display of the head output characterized in that
at least a pair of said parallel tracks on said medium is spanned by said transducing head for simultaneous reading thereby,
a uniform reference signal comprising
a plurality of bursts of constant-amplitude alternate-polarity pulse transitions of uniform spacing is magnetically impressed on one track of said pair of tracks,
a nonuniform auxiliary signal of matching amplitude to said reference signal comprising
a matching plurality of vertically aligned bursts of constant-amplitude alternate-polarity pulse transitions of continuously increasing spacing with the spacing at the center of each burst being equal to the uniform spacing on said one track but the polarity being opposite is magnetically impressed on the other track of said pair of tracks, and
said reference and auxiliary signals are mixed in the said transducing head to form an envelope pattern suitable for oscilloscopic display.

2. The system of claim 1 further characterized in that the envelope pattern observable in an oscilloscopic display and resulting from the mixing in said transducing head of the test and auxiliary signals magnetically impressed on said recording medium exhibits a null condition whose position with respect to the center of each burst is indicative of the degree of skew alignment of said transducing head with respect to said recording medium, perfect skew alignment being indicated by a null centered in each burst.

3. The system of claim 1 characterized in that the envelope pattern observable in an oscilloscopic display and resulting from the mixing in said transducing head of the test and auxiliary signals magnetically impressed on said recording medium exhibits a null condition whose null amplitude is a measure of the degree of transverse alignment of said transducing head with respect to the desired track position on said recording medium, perfect transverse alignment being indicated by a null of negligible amplitude measured across matching troughs.

4. The system of claim 1 further characterized in that
said reference signal magnetically impressed on said recording medium comprises a square wave of constant frequency, and
said magnetically impressed auxiliary signal comprises a square wave of linearly decreasing frequency, the frequency at the center of each burst being equal to the constant frequency of said reference signal.

5. The system of claim 1 further characterized in that
said reference signal magnetically impressed on said recording medium comprises a train of pulses of alternating polarity occurring at equal intervals of time, and
said magnetically impressed auxiliary signal comprises a train of pulses of alternating polarity occurring at linearly increasing intervals of time, the center intervals within each burst being said equal interval.

6. A method of establishing the alignment of a transducing head with respect to a magnetic recording medium having parallel information tracks thereon within the width of such transducing head with a magnetically impressed reference signal including
a plurality of blocks of pulses of uniform amplitude and spacing but alternating polarity on one of such tracks and
a magnetically impressed auxiliary signal including
a plurality of blocks of pulses of the same uniform amplitude as such reference signal and alternating polarity but linearly increasing spacing including spacing equal to the uniform spacing of such reference signal at the center of each block on another of such tracks comprising the steps of:
moving said magnetic medium with said test tracks embedded therein past said transducing head, and
displaying on an oscilloscope the simultaneous reading by said transducing head of said reference and auxiliary signals on said pair of tracks, said reading resulting in a display exhibiting a null condition whose position with respect to the center of a block is indicative of the degree of skew alignment.

7. The method of claim 6 in which the amplitude of the null condition observed in the displaying step is indicative of the degree of transverse alignment of said transducing head with respect to the desired track position on said recording medium.